US010127599B2

United States Patent
Maenpaa et al.

(10) Patent No.: US 10,127,599 B2
(45) Date of Patent: Nov. 13, 2018

(54) SYSTEM AND METHOD FOR ASSEMBLING A SHARED SHOPPING CART

(71) Applicant: MASTERCARD INTERNATIONAL INCORPORATED, Purchase, NY (US)

(72) Inventors: Pia Maenpaa, White Plains, NY (US); Joshua Kessler, Danbury, CT (US); Jaclyn Moore, Port Chester, NY (US); Erin Kieran, White Plains, NY (US); Laurie Chiola, Bedford Hills, NY (US); John Dallesandro, Millwood, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 457 days.

(21) Appl. No.: 13/774,361

(22) Filed: Feb. 22, 2013

(65) Prior Publication Data
US 2014/0244441 A1    Aug. 28, 2014

(51) Int. Cl.
*G06Q 30/00*    (2012.01)
*G06Q 30/06*    (2012.01)

(52) U.S. Cl.
CPC ..... *G06Q 30/0633* (2013.01); *G06Q 30/0601* (2013.01)

(58) Field of Classification Search
CPC ............... G06Q 30/00; G06Q 30/0601; G06Q 30/0613; G06Q 30/0641
See application file for complete search history.

(56) References Cited

U.S. PATENT DOCUMENTS

| | | | |
|---|---|---|---|
| 8,438,052 B1 * | 5/2013 | Chanda | G06Q 30/0282 705/7.11 |
| 2002/0038255 A1 * | 3/2002 | Tarvydas | G06Q 30/06 705/26.43 |
| 2006/0059099 A1 * | 3/2006 | Ronning | G06F 21/10 705/59 |
| 2010/0042515 A1 * | 2/2010 | Crespo | G06Q 30/06 705/26.1 |

(Continued)

OTHER PUBLICATIONS

Uehara, Satoru, Osamu Mizuno, and Tohru Kikuno. "An implementation of electronic shopping cart on the Web system using component-object technology." Object-Oriented Real-Time Dependable Systems, 2001. Proceedings. Sixth International Workshop on. IEEE, 2001. (Year: 2001).*

*Primary Examiner* — Michael Misiaszek
*Assistant Examiner* — Christopher B Seibert
(74) *Attorney, Agent, or Firm* — Ohlandt, Greeley, Ruggiero & Perle, L.L.P.

(57) ABSTRACT

A system and a method are provided for assembling, and publishing, a persistent cart of products online. The cart can have products from a single vendor or a variety of different vendors. When the cart is published, various deals, discounts, and incentives can be offered. An individual who created the cart can be rewarded. A computer readable non-transitory storage medium stores instructions of a computer program that when executed facilitates creation of the cart of items to be purchased and selects the individual or group of individuals to whom the cart is published. The purchasing of a cart does not eliminate the availability of the cart for subsequent users.

9 Claims, 4 Drawing Sheets

(56) References Cited

U.S. PATENT DOCUMENTS

| | | | |
|---|---|---|---|
| 2010/0185514 A1* | 7/2010 | Glazer | G06Q 30/0253 705/14.51 |
| 2012/0226573 A1* | 9/2012 | Zakas | G06Q 30/0207 705/26.2 |
| 2012/0323682 A1* | 12/2012 | Shanbhag | G06Q 30/0601 705/14.51 |
| 2013/0290172 A1* | 10/2013 | Mashinsky | G06Q 20/12 705/39 |
| 2014/0122203 A1* | 5/2014 | Johnson | G06Q 30/00 705/14.23 |
| 2015/0169624 A1* | 6/2015 | Gupta | G06F 17/30864 707/639 |
| 2016/0171540 A1* | 6/2016 | Mangipudi | G06Q 30/0255 705/14.53 |

* cited by examiner

SYSTEM AND METHOD FOR ASSEMBLING A SHARED SHOPPING CART

BACKGROUND OF THE DISCLOSURE

1. Field of the Disclosure

The present disclosure relates to electronic shopping. More particularly, it relates to a system and/or method for allowing an individual to assemble an online shopping cart that can be purchased more than once, by the individual who assembled the shopping cart and/or others.

2. Description of the Related Art

There are a variety of ways in which vendors bundle products. For example, some vendors, such as flower shops, offer flowers and a box of chocolates as a Valentine day package. At least one music festival offers a concert and a picnic as a package.

Other examples include travel services that offer airline tickets, car rentals and hotel stays as a package deal. At least one food service allows ordering of a predefined grocery basket of food. Another makes available bundles of party packs for children.

These existing instances of bundled products, which yield the same result as a cart, are initiated by the vendor. Carts created by visitors to online sites are eliminated once purchased and carts are not available for other shoppers. Merchants may display other items viewed by customers who purchased the item but do not display entire carts purchased. Merchants may display items from multiple vendors and allow users to buy them as a single purchase while items are shipped separately from various sub-vendors (e.g., amazon.com).

SUMMARY OF THE DISCLOSURE

There is provided a system and/or method for an individual to assemble a persistent online shopping cart of items.

There is also provided a system and/or method to assemble an online shopping cart that can contain items from a single vendor or from a variety of different vendors.

There is further provided that such a system and/or method can have the cart with published deals so that discounts and/or incentives can be offered. Further, an individual who created the cart can be rewarded.

There is also provided a system for creating an online cart of items to be purchased including a processor for executing computer instructions for permitting selection of items to be purchased to form the cart, and an electronic storage device for storing data representing the cart and the plurality of items that are contents of the cart. The processor follows computer instructions for selection of the cart by an individual or multiple individuals that the cart will be available to for purchase of items in the cart.

There is further provided a method for creating an online cart of items to be purchased including selecting items to be purchased to form a cart, storing in an electronic storage device data representing the cart and the items of the cart, and selecting an individual or group of individuals that the cart will be made available to for use in purchasing all or any of the items in the cart.

There is further provided a method for creating an online cart of items to be purchased from a plurality of shopping sites including selecting at least one item to be purchased from a first shopping site of a plurality of shopping sites; storing in an electronic storage device data representing the at least one item to an individual's shopping cart that is not associated with the first shopping site; and saving the at least one item from the first shipping site to form a shopping cart.

There is yet further provided a computer readable non-transitory storage medium storing instructions of a computer program, which instructions when executed by a computer system, results in creating an online cart of items for purchase. The instructions result in the performance of the steps of: providing for selection of items to be purchased to form a cart; storing in an electronic storage device data representing the cart and the items of the cart; and providing for selection of an individual or group of individuals that will be available to for purchase of items in the cart.

The present disclosure also provides a computer readable non-transitory storage medium storing instructions of a computer program that when executed by a computer system results in performance of steps for assembling or creating an online cart of items to be purchased, and selecting the individual or group of individuals to whom the cart is published.

BRIEF DESCRIPTION OF THE DRAWINGS

A component or a feature that is common to more than one figure is indicated with the same reference number in each figure.

DESCRIPTION OF THE PREFERRED EMBODIMENT

Figure 1:
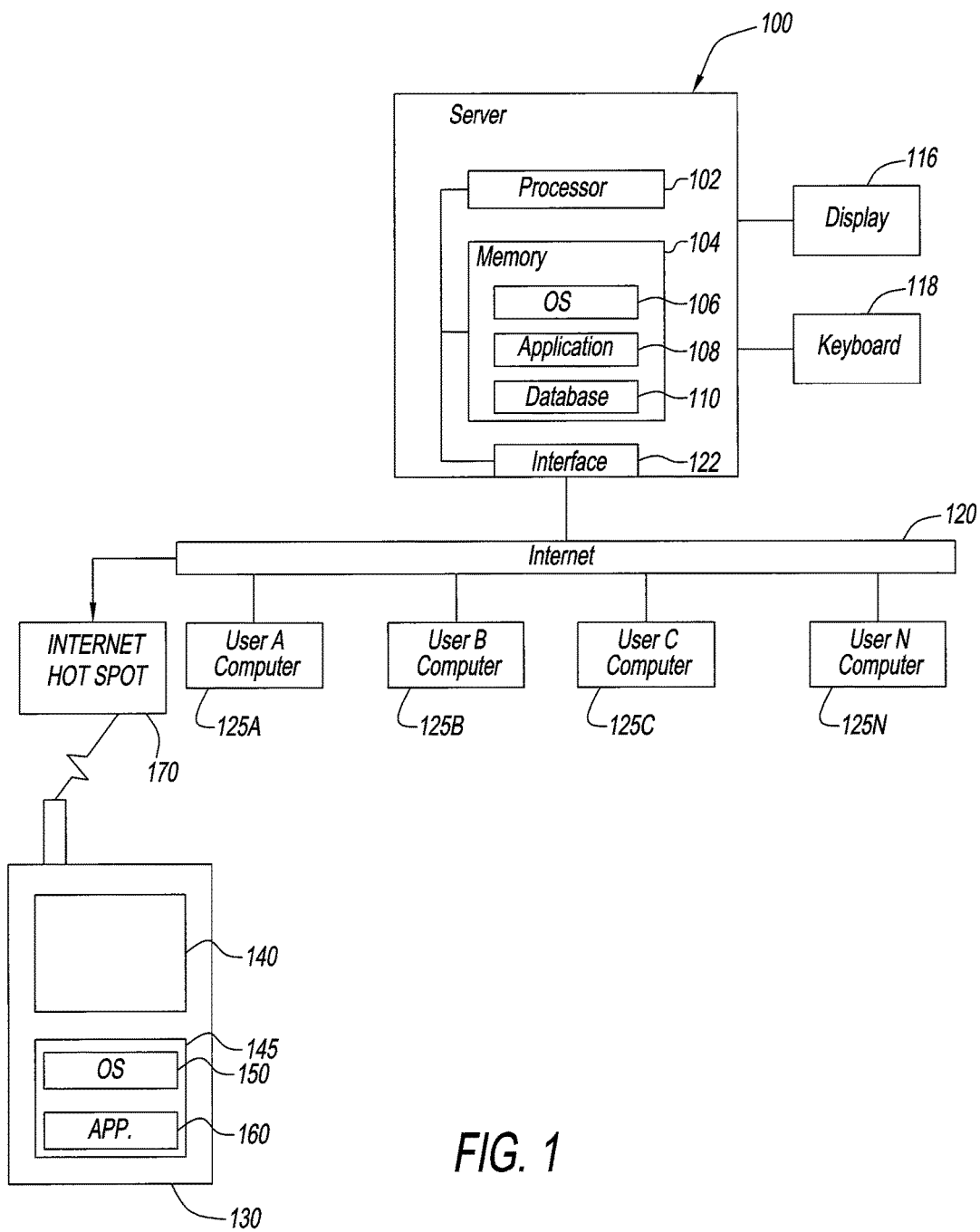
FIG. 1 is block diagram of system for implementing an exemplary embodiment of the present disclosure.

Referring to the drawings and, in particular, FIG. 1, a web site is operated on a server generally represented by reference numeral 100. Server 100 is connected to the Internet 120 by an interface 122. Server 100 includes a data processor 102 and a memory 104. Server 100 is connected to a display 116 and a keyboard 118. It will be understood that server 100 may have a plurality of other peripheral devices customarily found in any computer connected to the server. Such peripheral devices are, for example, a CD or DVD drive (not shown) for placing programs on server 100 or for creating physical records of data processed by server 100. Server 100 may also be comprised of multiple linked or independent servers as applicable for required data management.

Memory 104 may have a memory portion 106 for an operating system ("OS") for server 100, a memory portion 108 for one or more application programs including one that is the subject of this disclosure, and a memory portion 110 used as the storage for a database.

The data of the database stored in memory portion 110 may be stored in any type of memory including, for example, a hard drive, a flash memory, a CD, a RAM, or any other suitable memory, with provisions for suitable backup as well known in the art.

As described below, user computers 125A, 125B, 125C to 125N can access server 100 via a connection to the Internet 120.

A mobile device 130 having a display 140 may have a memory 145 for storing an operating system 150 and series of applications or applets therein. The series of applications or applets include an applet or application program (hereinafter an application) 160. Mobile device 130 may access server 100 via an Internet connected Wi-Fi hot spot 170 or by any wireless data network, such as a 3G or 4G system, on which mobile device 130 communicates. Application 160 may be a thin client. The 'application' may also be a cloud based service accessed via the Browser application in the internet connected device.

A shopping cart may be built by a user using a computer 125A, 125B, 125C to 125N, or by using mobile device 130. These carts may be purchased by a consumer using a computer 125A, 125B, 125C to 125N, or by using mobile device 130.

Server 100 may be operated by a vendor with multiple items to offer to consumers. Alternatively, server 100 may be operated by a business that does not sell goods, but offers the service of carts to other merchants. Such carts may be perpetually available for purchase after an initial or prior purchase or available for a limited period of time or a predefined period of time after purchase. Server 100 may also be operated by a business offering a unified shopping experience that includes items from multiple vendors. Alternatively server 100 may only provide the service for building, publishing and re-selling carts. Further, server 100 may only be provided to a user, such as an individual, that does not sell goods, but populates a cart for purchase of the contents by himself, and or others.

Figure 2:
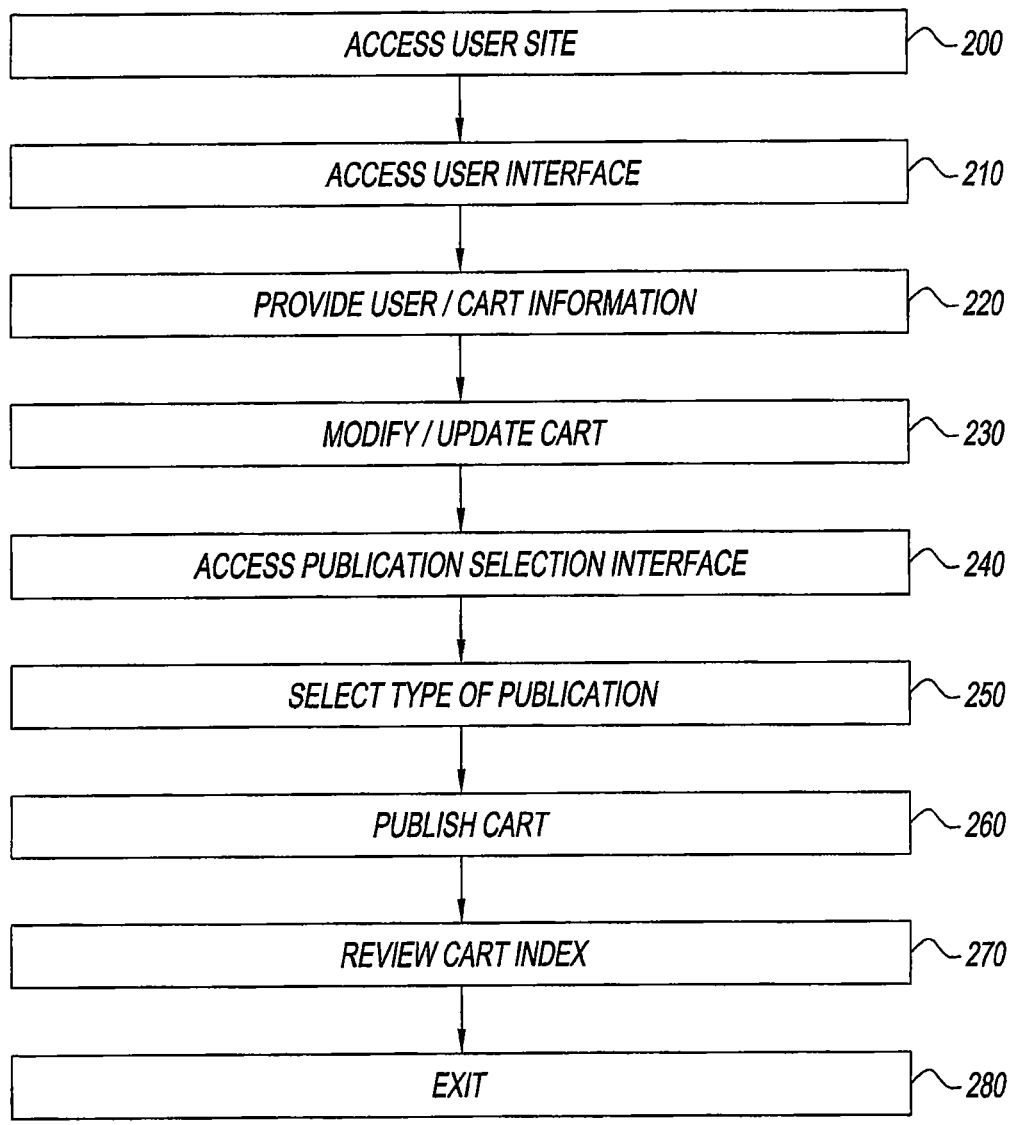
FIG. 2 is a flow chart representing the manner in which a shopping cart of the exemplary embodiment of the present disclosure is assembled.

Referring to FIG. 2, at 200, namely the access to the user site, the user, using a user computer 125A, 125B, 125C or 125N (or mobile device 130) shown in FIG. 1 accesses server 100. Optionally, a log-on screen may be displayed on the user's device, such as computer 125A, on which the user may be required to log on using a user name and password or equivalent method. An initial display screen may offer options to the individual using server 100 to log in as a user who wishes to create a cart, or as a consumer who wishes to purchase items in a cart and already has an account within the service. The description of FIG. 2 applies to the user who is creating a cart. The description of FIG. 3 applies to the consumer who wishes to purchase items in a cart.

The term "cart" as used herein is intended to include online shopping carts that are populated with items for purchase, as well as lists of items and baskets of items to be purchased, generally together. However, such carts, lists or baskets of items can be modified by consumers, to add, remove, or modify items when making a purchase.

Referring again to FIG. 2, a user sees the home page and a login option. A user interface is accessed at 210. At 220, the user provides cart information using one or more screens associated with the user interface. Cart information may include the user's name or other identifying information, a name and description for the cart being created (chosen to permit consumers to readily find the cart during a search), and the geographic region or regions where cart is available. Once the user picks an item for the cart, all relevant and available details, including but not limited to, name, description, and image link, are automatically populated. The user then continues to pick items to the cart, again with the with the available details automatically populated, and a descriptor can be added for each item in the cart, an image of the item, the price at which each item in the cart is currently being offered, and the address or uniform resource locator (URL) of a corresponding website where information about the item in the cart may be found is automatically populated in the cart.

Price information can be made available for each item in a cart, and provisions are made for updating prices, so that the price displayed will be the most current price. Various provisions can be made for updating price, such as automatically checking web sites from which an item in a cart is ordered. Preferably, an API allowing access to item details can be deployed by merchants for their site. Such an API allows server 100 to retrieve the current price of an item, as well as inventory level and finally, the same information for related items (such as other sizes of an item).

At 230, the shopping cart may always be modified or updated by the cart originator. At 240, the user accesses a publication selection interface. This interface permits the user to determine the manner in which the cart will be published, and thus the potential consumer who will be targeted for use of the cart. At 250, the user selects the type or extent of publication desired. For example, the user may wish the cart to be visible to all potential consumers, or to consumers in a specific geographic area only, or to a selected group of people, or private and available only to the user. The selection of the type or extent of publication for any cart may be modified if the user again logs on and accesses the cart created by that user. Other users may create modified carts, under different names and descriptions, by using as a start point a cart accessible to these other users. The existence of the cart can also be published on a social media site or e-mails can be sent to one or more selected individuals.

The cart is published, generally online, at 260. The preferred choice for publication of the cart may be making the cart generally availability to the public. If certain goods are available only in a given geographic region, then publication of a cart containing those goods may be limited to the given geographic region or e.g., for a limited time, although modifications of the cart having goods more widely available can be more widely published.

Publication may be limited to a particular geographic area based on user preference, or on the user's country of origin. This may be significant in that some merchants may not wish to ship internationally. The geographic area of default publication may be based on the user's IP address, but in all cases, in compliance with any applicable privacy laws. Provisions are made for entering a different geographic area, if a user is away from her usual location. As an alternative, the current location of the user can be the default location with provisions for switching to the user's country of origin.

The data representative of the cart and its contents is stored in the database of memory portion 110 of FIG. 1 in a searchable format, including text searchable. An underlying database program may be used. This allows consumers to readily search for carts having descriptions that interest them, items of interest, by location, or by cart creator, if they have had a favorable experience purchasing other carts created by the same person or entity. Searches can also be conducted by product, keyword, most popular cart, most popular item in a cart, theme, and price.

There are several reasons why the user may publish the cart with access only to the user. One reason may be privacy concerns. The cart may be only for personal purchase, but the user wants to retain the option to purchase again at a later date. A further reason is that the user may wish to acquire the items purchased, and have an opportunity to see whether the items work well together or are of suitable quality, before making the cart available to others. Further, the user may wish to make a recurring purchase of a fixed set of goods easy and quick. An incentive may be offered to cart originators based on subsequent cart purchases made by other consumers. Where an incentive is offered to the user who created a cart, the user may optimize the cart by substituting new or different items for those originally in the cart, or by adding items to the cart, to make the cart more effective for its intended purpose before it is available to others.

At 270, a cart index can be optionally accessed or reviewed. The cart index is representative of the popularity of the cart, and may represent, for example, the number of times the cart has been accessed and used to make a purchase and users' rating of the quality of the cart. During the initial use of the web site hosted by server 100, the information displayed may indicate that the cart has not been used. During subsequent access to the site, if the cart is or has been used to make purchases, the data will change in accordance with the popularity of the cart. Viewing this data will also allow the cart originator to determine whether a potential incentive has been earned due to the use of the cart by others.

It is also possible to include, for each item in a cart, a link to a page, preferably generated by server 100, where comments on or users' experience with that item or cart can be stored on server 100, and subsequently read by those who access that page. The entire cart could be rated.

The user exits from the service at 280, by logging off with the user computer 125A, 125B, 125C to 125N or mobile device used, on a portion of the user interface displayed, or simply closes the browser used to access server 100 of FIG. 1.

Figure 3:
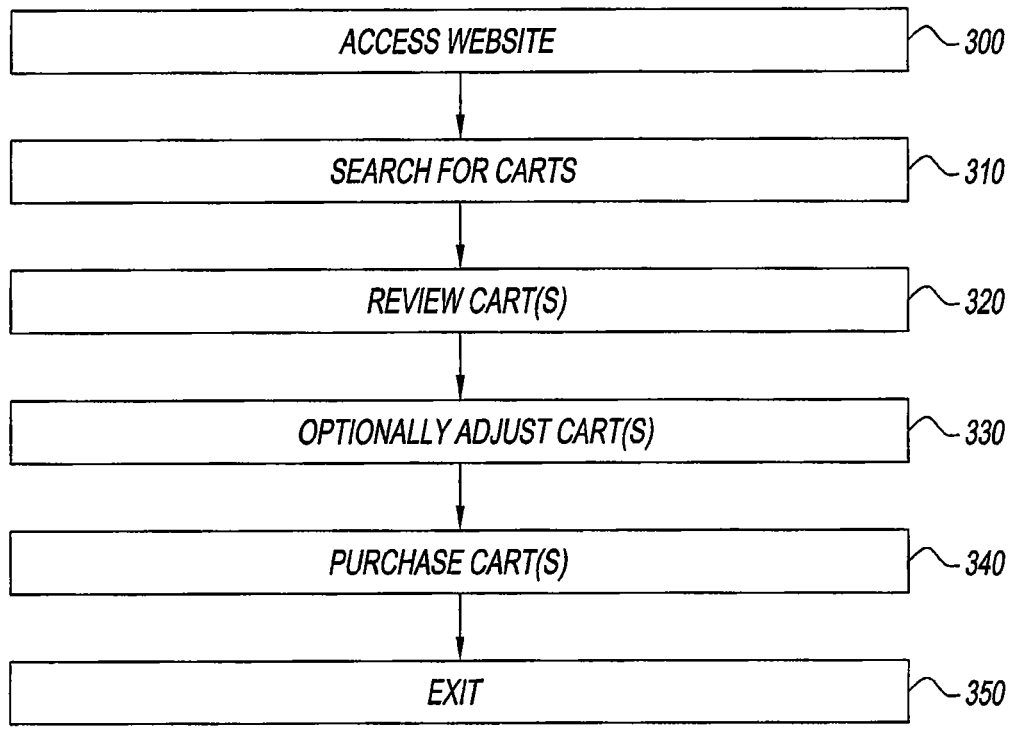
FIG. 3 is a flow chart representing the manner in which a consumer uses the system of FIG. 1 to purchase a shopping cart.

Referring to FIG. 3, at 300, a consumer accesses the website being hosted by server 100. Consumers may be permitted to use server 100 without having to log on, or it may be necessary to have a user name and password or equivalent login procedure.

When a consumer accesses server 100 and, if required, logs on, a search screen is provided to the consumer to search for carts of interest. Carts that match the user's preferences and popular carts may also be shown automatically. A search may be directed to the descriptive word or words or images or keywords/groups provided by the user of server 100 who created the cart, or the descriptive terms used for the items in the cart, or the name used by the user who created the cart, as provided at 220 of FIG. 2. The name used when the cart was created may be of interest to a consumer if that consumer has previously found other carts created by the same individual to be of interest. This may indicate particular kinds of item that interest that consumer, or it may be that the consumer believes that the user or entity that created the cart is particularly skillful in assembling items to create a cart. As used herein, an entity is any one of a group, an institution, a business or any other organization.

At 320, the consumer reviews the cart or carts to determine whether there is interest in making a purchase. Also at 320, the items of an individual cart may be accessed and at 330 an opportunity is presented to make adjustments in its content. For example, the consumer may find the cart to be otherwise adequate, but may wish to delete a particular item or items. The consumer may wish to substitute a different item, e.g. size or color, for one of the items in the cart, or add an item to the cart.

At 340, the consumer executes a purchase of the cart or carts that have been selected. The information needed to make the purchase can be available to server 100 using a digital wallet system or another online electronic payment purchasing system. This can be done online by using one of the user computers 125A, 125B, 125C to 125N, or by using mobile device 130. At 350, the service/website is exited.

Figure 4:
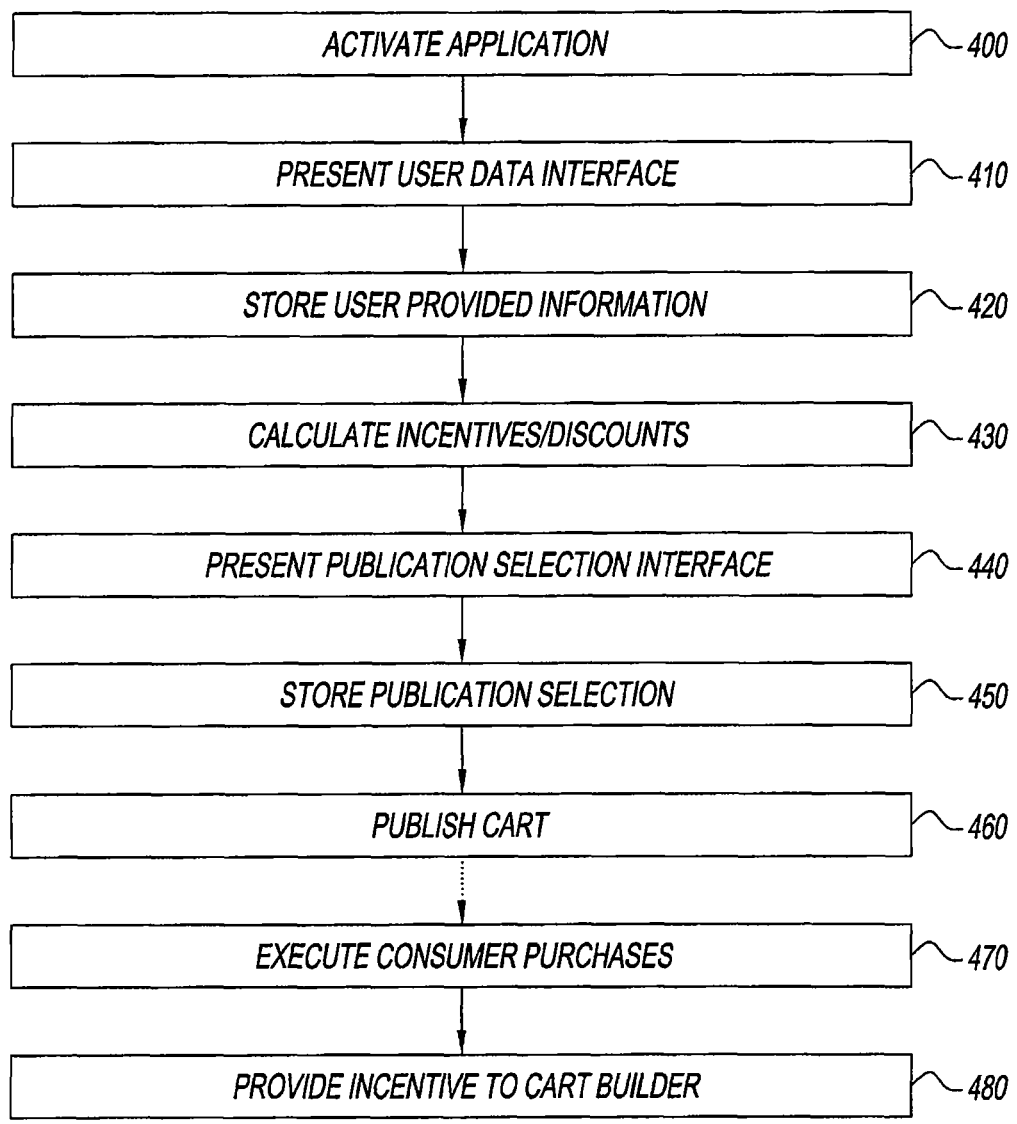
FIG. 4 is a flow chart representing the manner in which the system of FIG. 1 operates when a shopping cart is being assembled or built and when an order is placed.

FIG. 4 illustrates the operation of the system of FIG. 1, when a cart is being assembled or built and when an order is placed. As described above with respect to FIG. 2, when a user has logged on, the application program in memory portion 108 is activated at 400. At 410, the application program presents a user interface, and user data for the cart created is entered. There are two ways of building a cart. First, the user can select items from lists provided by the cart building system. Second, the user can use a widget (or a "browser plug-in") whenever browsing a product on a shopping site, and the widget will create a personal link in the user's shopping cart account that can later be attached to a specific shopping cart. At 420, when the user indicates that the data or information should be saved, the data is stored in the database in memory portion 110 of memory 104 of FIG. 1. Any incentives or discounts associated with the cart can be calculated at 430, and are also stored. The calculation required should be dynamic, and also can be done at the time of purchase, at 470 below, to incorporate current pricing and availability. A present publication selection interface is provided at 440. The publication selection for the type or extent of publication is stored at 450. At 460, the cart is published in accordance with the selection made.

Generally at a later time, 470, server 100 automatically executes the required purchases, after a consumer has purchased a cart or carts, 340 of FIG. 3. If the server 100 is hosted by a business that sells items in the cart, the server 100 can direct the business to fill the order by either shipping and/or delivering the items in the cart or carts ordered, or by packing the items to await pick up. If server 100 is operated by an entity that does not sell the ordered items in the cart or carts, server 100 can communicate with a business or businesses that sell the items, via the Internet 120, to automatically execute the required purchases. It will be understood that to the extent that confidential information must be transmitted, secure transmission technology shall be used. The server 100 also communicates to the user the summary of their purchases in the cart, and the customer also receives customary digital receipt from the business offering the cart service. The receipt may include several transactions that are made to various sub-vendor accounts.

At 480, any incentive or reward provided to a user or cart builder who created a frequently used cart is calculated, and provided to that user. The incentive may be provided in any method chosen by the business, and the method will be known to the cart creator before carts are built. For example, the incentive may be in the form of a credit toward purchases at a business hosting the server, or it may be in the form of an amount of money transferred to an account owned by that user. Alternatively, discount coupons may be offered (electronically or otherwise) to that user, or the user may be credited with other incentives such as, for example, frequent flyer miles if appropriate arrangements are in place with an airline or airlines. The value of the incentive may be related to the total value of the goods purchased, or may be a fixed amount for every time the cart is used to make a purchase. User's existing loyalty cards information can also be passed on to the applicable merchant in case such information is available for the user at their service account or digital wallet if used, and the merchant may provide incentives for promoting their products and services.

Various devices, approaches, technologies and pathways can be used to access server 100. In general, the Internet can be used and access may be granted to a home or a business computer, including a desk top, lap top, or notebook computer, from a personal digital assistant, or any other Internet connected device, such as a tablet (for example, a device such as an iPad®), a mobile telephone, or in general, a mobile device 130 mentioned above.

The manner in which the owner of server 100 exploits the present system and/or method can vary. The server 100 can be accessed via a web site and can be available for free to the general public. This may be the situation for a big box store. Other owners can make individual arrangements with vendors having goods in a cart that has been published to obtain some form of compensation. There are other possibilities for providing access to the server 100, and for exploiting its use as a service. If an individual or an entity wishes to participate in the use of a system as described herein, it is preferable to have an agreement in place between the owner of the system and the participating entity, concerning the terms of such use.

Examples: A Parent and Teacher Association (PTA) at a school defines a school supply list cart, or series of carts for different grades, and sends a link to the cart or carts to the parents of students who attend the school. Parents can then easily purchase the cart or carts by making a selection or selections online. The school or PTA can, benefit from possible discounts or offers merchants may make available. For example, a merchant could offer products at a lower price or an incentive for purchases of items in the carts, entire carts, or a particular number of carts if a given sales volume is reached. Schools and institutions can publish book lists for each grade online instead of handing out a written list. Electronic materials can be specified for purchase instead of physical goods.

A chef can create a dinner menu for a grocery store and build a cart that includes everything that is needed for the dinner. The consumer selects the cart and picks up the ingredients that have already been bagged at the store. When the link is followed, other links that are made available can provide online recipes and an instructive video.

The two aforementioned examples are only two possible applications of the currently disclosed system and method.

An interested user of the present system can build any kind of coordinated or interesting cart. Some further examples include a picnic basket, coordinated outfit(s), a technology/device/service bundle, a room accessories pack, a set of living room furniture, and a kitchen starter kit. Bloggers can publish carts of products linked to their posts. Digital goods can be bundled with physical goods.

The system and method disclosed herein provide numerous advantages. The consumer has the benefit of a faster buying experience and the benefit from the knowledge of experts in their various fields sharing their picks and recommendations in forms of carts for purchase. Products and services that would otherwise take a great deal of time to research and assemble are provided to the consumer with relatively little effort, and the consumer can purchase all of the items in the cart in a single transaction. The consumer has opportunities to participate in bulk ordering and thus could receive the benefit of large scale purchasing, for example, during a defined period of time, because the merchants know such items sell well through this kind of a channel. The merchant can utilize the power of peer promotion to have customers recommend the merchant's products by including them in their carts, thus possibly lowering traditional advertising spending. The merchant can recognize customers loyal to the merchant or to a brand and can provide the option of rewarding these customers in new ways, such as credits for future purchases. The merchant also benefits from increased sales due to better visibility to targeted customers who are likely to make purchases. Payment card issuers, acquirers and payment system operators also benefit from the use of payment cards or other digital payment methods, such as electronic wallets.

It will be understood that the present disclosure may be embodied in a computer readable non-transitory storage medium storing instructions of a computer program that when executed by a computer system results in performance of steps of the method described herein. Such storage media may include any of those mentioned in the description above.

The term "assemble" means finding, selecting and including one or more items in a shopping cart.

The terms "comprises" or "comprising" are to be interpreted as specifying the presence of the stated features, integers, steps or components, but not precluding the presence of one or more other features, integers, steps or components or groups thereof.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method of creating an online cart of items to be purchased from a plurality of shopping sites comprising:
    selecting at least one item to be purchased from a first shopping site of a plurality shopping sites;
    storing, by a processor, in an electronic storage device of a server, data that represents the at least one item;
    saving the at least one item from the first shopping site to form a shopping cart for a user that is not associated with the first shopping site;
    populating the shopping cart with a descriptive name of the at least one item, an image of the at least one item, and a price of the at least one item, along with automatically populating with information from the first shopping site, wherein the server is operatively connected to an application program interface configured to allow the server to automatically retrieve at least the price and inventory level of the at least one item;
    presenting a user interface of the shopping cart on a user device, the interface comprising the descriptive name, the image, and the price;
    publishing the shopping cart to an online channel for visibility to a select person or persons, and limited to a particular geographic area based on an IP address of the user device, in response to the user making an extent of publication selection from the user interface,
    wherein the cart has a cart index that is accessible to the user and the cart index is representative of at least (1) a frequency that cart has been accessed and used to make a purchase or (2) a quality rating of the cart by the select person or persons; and
    calculating a reward for the use based on the frequency and providing the reward to the user,
    wherein the shopping cart is available after a first purchase for a limited and predefined period of time after the first purchase for subsequent purchases by the select person or persons, and
    wherein the shopping cart is generated by a server configured to generate a publication selection interface configured to allow the user to select parameters for the extent of publication for the shopping cart.

2. The method according to claim 1, wherein the selection of the at least one item from the first shopping site is accomplished by engaging an icon associated with the first shopping site that is linked to the shopping cart via the Internet.

3. The method according to claim 1, further comprising:
selecting at least one item to be purchased from a second shopping site of the plurality of shopping sites;
populating the shopping cart with a descriptive name of the at least one item from the second shopping site, an image of the at least one item from the second shopping site, and a price of the at least one item from the second shopping site, along with automatically populating with information from the first shopping site;
storing in the electronic storage device data representing the at least one item from the second shopping site to the shopping cart; and
saving the at least one item from the second shopping site to the shopping cart that includes the at least one item from the first shopping site,
wherein the selection of the at least one item from the second shopping site is accomplished by engaging an icon associated with a second shopping cart via the Internet.

4. The method of claim 1, further comprising modifying the shopping cart to replace, add or remove one or more items.

5. The method of claim 1, further comprising tracking a frequency for which the shopping cart is used to make a purchase.

6. The method of claim 1, wherein the data representing the shopping cart and at least one item of the shopping cart includes the data selected from the group consisting of data representing a geographic availability of consumer pick up or shipping, items of the shopping cart, and user experience with the plurality of items of the shopping cart.

7. The method of claim 1, further comprising accessing the data representing the shopping cart and the plurality of items of the shopping cart with an Internet connected device, wherein the Internet connected device is one selected from the group consisting of a mobile device, a computer, a tablet, and a personal digital assistant.

8. The method of claim 1, wherein the select persons is at least one group selected from the group consisting of: all potential consumers, and a social media website.

9. The method of claim 1, wherein
the electronic storage device comprises
a shopping cart database for storing data representative the shopping carts formed by the server, the representative data comprising searchable text for the content of each shopping cart and its contents; and
an underlying database program configured for searching the database by at least description, items of interest, location, and cart creator.

* * * * *

UNITED STATES PATENT AND TRADEMARK OFFICE
CERTIFICATE OF CORRECTION

PATENT NO. : 10,127,599 B2
APPLICATION NO. : 13/774361
DATED : November 13, 2018
INVENTOR(S) : Pia Maenpaa et al.

Page 1 of 1

It is certified that error appears in the above-identified patent and that said Letters Patent is hereby corrected as shown below:

On the Title Page

Under "Assignee", Item (73) - please correct: "MASTERCARD INITERNATIONAL INCORPORATED" to – MASTERCARD INTERNATIONAL INCORPORATED –

Signed and Sealed this
Eleventh Day of December, 2018

Andrei Iancu
*Director of the United States Patent and Trademark Office*